US009310475B2

(12) United States Patent
Steinbacher et al.

(10) Patent No.: US 9,310,475 B2
(45) Date of Patent: Apr. 12, 2016

(54) METHOD AND APPARATUS FOR TRANSMITTING MULTIPLE BEAMS

(75) Inventors: Franz Steinbacher, Vocklamarkt (AT); Matthias Schmied, Ebensee (AT)

(73) Assignee: General Electric Company, Schenectady, NY (US)

( * ) Notice: Subject to any disclaimer, the term of this patent is extended or adjusted under 35 U.S.C. 154(b) by 2664 days.

(21) Appl. No.: 10/858,881

(22) Filed: Jun. 2, 2004

(65) Prior Publication Data

US 2005/0111846 A1    May 26, 2005

Related U.S. Application Data

(60) Provisional application No. 60/524,276, filed on Nov. 21, 2003.

(51) Int. Cl.
*A61B 8/00* (2006.01)
*G01S 7/52* (2006.01)
*G01S 15/89* (2006.01)

(52) U.S. Cl.
CPC ........... *G01S 7/52093* (2013.01); *G01S 7/5209* (2013.01); *G01S 7/52046* (2013.01); *G01S 7/52092* (2013.01); *G01S 7/52095* (2013.01); *G01S 15/8927* (2013.01); *G01S 15/8952* (2013.01); *G01S 15/8959* (2013.01)

(58) Field of Classification Search
CPC .......................... G01S 7/52046; G01S 7/5209
USPC .................. 600/407, 408, 439, 437; 601/2–4; 604/20–22; 73/584, 1.82
See application file for complete search history.

(56) References Cited

U.S. PATENT DOCUMENTS

| 4,552,020 A | * | 11/1985 | Auphan | ........................ | 73/602 |
| 4,699,009 A | | 10/1987 | Maslak et al. | | |
| 4,752,896 A | * | 6/1988 | Matsumoto | ................... | 600/437 |
| 5,581,517 A | | 12/1996 | Gee et al. | | |

(Continued)

FOREIGN PATENT DOCUMENTS

| EP | 0 222 294 B1 | 5/1987 |
| EP | 0 335 578 A2 | 10/1989 |

(Continued)

*Primary Examiner* — Amanda Lauritzen Moher
(74) *Attorney, Agent, or Firm* — Dean D. Small; The Small Patent Law Group, LLC (57) ABSTRACT

A method is provided for acquiring ultrasonic data using multi-beam transmission. The method includes transmitting a first transmit beam using a first subset of element and transmitting a second transmit beam using a second subset of the elements. The first and second subsets of elements comprising at least one common element. The first and second beams are transmitted simultaneously. The elements are divided into the first and second subsets that may comprise at least partially different subsets of elements. An ultrasonic system is also provided that comprises a transducer comprising an array of elements and a beamformer for dividing the array of elements into at least first and second subsets of elements. The first and second subsets of elements at least partially overlapping. A transmitter drives the first and second subsets of elements to simultaneously transmit different first and second transmit beams, respectively. A receiver receives receive lines representative of the first and second transmit beams. The transmitter may transmit different first and second coded transmit waveforms from the first and second subsets of elements.

10 Claims, 6 Drawing Sheets

(56) References Cited

U.S. PATENT DOCUMENTS

| | | | |
|---|---|---|---|
| 5,623,928 A | 4/1997 | Wright et al. | |
| 5,675,554 A | 10/1997 | Cole et al. | |
| 6,046,632 A * | 4/2000 | Straw | 330/2 |
| 6,110,116 A | 8/2000 | Wright et al. | |
| 6,123,669 A | 9/2000 | Kanda | |
| 6,179,780 B1 | 1/2001 | Hossack et al. | |
| 6,213,947 B1 * | 4/2001 | Phillips | 600/443 |
| 6,277,073 B1 | 8/2001 | Bolorforosh et al. | |
| 6,358,210 B2 | 3/2002 | Gee et al. | |
| 6,363,033 B1 | 3/2002 | Cole et al. | |
| 6,517,489 B1 | 2/2003 | Phillips et al. | |
| 6,730,033 B2 * | 5/2004 | Yao et al. | 600/443 |
| 6,773,399 B2 * | 8/2004 | Xi et al. | 600/443 |
| 6,796,944 B2 * | 9/2004 | Hall | 600/443 |
| 7,037,265 B2 * | 5/2006 | Hao et al. | 600/447 |
| 2003/0018261 A1 | 1/2003 | Bae | |
| 2003/0163046 A1 * | 8/2003 | Nohara et al. | 600/443 |
| 2004/0024316 A1 * | 2/2004 | Xi et al. | 600/447 |
| 2004/0054285 A1 * | 3/2004 | Freiburger et al. | 600/447 |
| 2005/0004468 A1 * | 1/2005 | Abend et al. | 600/453 |
| 2005/0049502 A1 * | 3/2005 | Schoisswohl | 600/453 |
| 2005/0054925 A1 * | 3/2005 | Hao et al. | 600/443 |

FOREIGN PATENT DOCUMENTS

| | | |
|---|---|---|
| EP | 0 442 450 A2 | 8/1991 |
| JP | 62-112089 | 5/1987 |
| JP | 10-177072 | 6/1998 |
| JP | 2000-116652 | 4/2000 |
| JP | 2002515115 T | 5/2002 |
| WO | WO 96/04568 | 2/1996 |

* cited by examiner

METHOD AND APPARATUS FOR TRANSMITTING MULTIPLE BEAMS

CROSS REFERENCE TO RELATED APPLICATIONS

This application claims priority to and the benefit of the filing date of U.S. Provisional Application No. 60/524,276 filed on Nov. 21, 2003 and which is hereby incorporated by reference in its entirety.

BACKGROUND OF THE INVENTION

The invention relates generally to diagnostic ultrasound systems. In particular, the present invention relates to method and apparatus for transmitting and receiving multiple beams with a single transducer.

Transducers transmitting to more than one non-overlapping aperture exist to acquire data. Method and apparatus are needed when using multiple apertures to increase the frame rate to provide the data rates needed for color Doppler, and 3D and 4D imaging. Heretofore, ultrasound methods and systems have experienced limitations on the rate at which data is obtained, due in part to limitations on the rate at which ultrasound signals can be transmitted into a object of interest.

Thus, a system and method are desired that can increase the rate at which ultrasound beams can be transmitted into an object.

BRIEF DESCRIPTION OF THE INVENTION

A method is provided for acquiring ultrasonic data using multi-beam transmission. The method includes transmitting a first transmit beam using a first subset of element and transmitting a second transmit beam using a second subset of the elements. The first and second subsets of elements comprising at least one common element. The first and second beams are transmitted simultaneously. The elements are divided into the first and second subsets and the first and second subsets may comprise at least partially different subsets of elements.

An ultrasonic system is provided that comprises a transducer comprising an array of elements and a beamformer for dividing the array of elements into at least first and second subsets of elements. The first and second subsets of elements at least partially overlapping. A transmitter drives the first and second subsets of elements to simultaneously transmit different first and second transmit beams, respectively. A receiver receives receive lines representative of the first and second transmit beams. The transmitter may transmit different first and second coded transmit waveforms from the first and second subsets of elements.

DETAILED DESCRIPTION OF THE INVENTION

Figure 1:
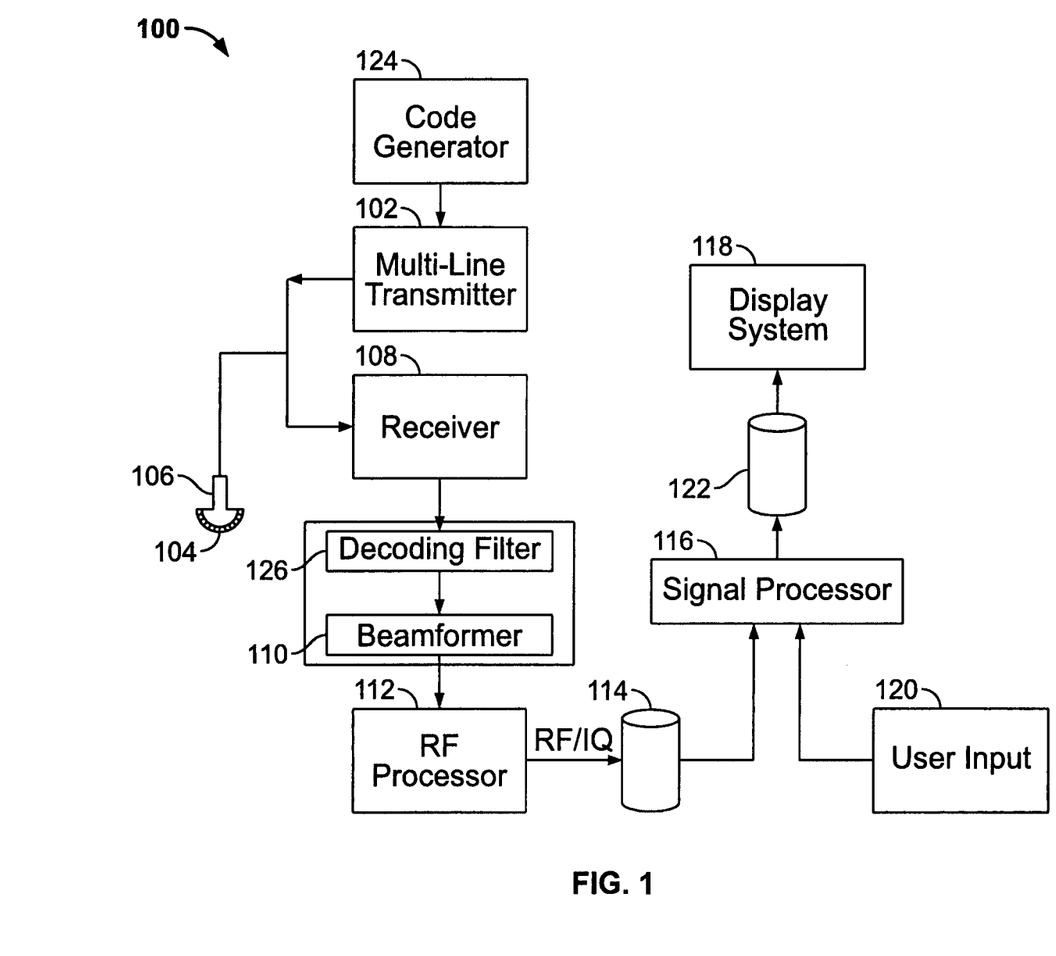
FIG. 1 illustrates a block diagram of an ultrasound system formed in accordance with an embodiment of the present invention.

FIG. 1 illustrates a block diagram of an ultrasound system 100 formed in accordance with an embodiment of the present invention. The ultrasound system 100 includes a multi-line transmitter 102 which drives elements 104 within a transducer 106 to emit pulsed ultrasonic signals into a body. The multi-line transmitter 102 may transmit N lines. A code generator 124 generates one or more codes which may be used when transmitting N lines. A variety of geometries may be used. The ultrasonic signals are back-scattered from structures in the body, like blood cells or muscular tissue, to produce echoes which return to the elements 104. The echoes are received by a multi-line receiver 108. The received echoes may comprise M lines, wherein M is greater than N for multi-line transmission. The received echoes are passed through a beamformer 110 comprising at least M receiving channels, one receive channel per received line, which performs beamforming. The beamformer 110 passes data to a decoding filter 126, which decodes the data for M received lines. The code generator 124 and decoding filter 126 will be discussed further below. The RF signal then passes through an RF processor 112. Alternatively, the RF processor 112 may include a complex demodulator (not shown) that demodulates the RF signal to form IQ data pairs representative of the echo signals. The RF or IQ signal data may then be routed directly to RF/IQ buffer 114 for temporary storage. A user input 120 may be used to input patient data, scan parameters, a change of scan mode, and the like.

The ultrasound system 100 also includes a signal processor 116 to process the acquired ultrasound information (i.e., RF signal data or IQ data pairs) and prepare frames of ultrasound information for display on display system 118. The signal processor 116 is adapted to perform one or more processing operations according to a plurality of selectable ultrasound modalities on the acquired ultrasound information. Acquired ultrasound information may be processed in real-time during a scanning session as the echo signals are received. Additionally or alternatively, the ultrasound information may be stored temporarily in RF/IQ buffer 114 during a scanning session and processed in less than real-time in a live or off-line operation.

The ultrasound system 100 may continuously acquire ultrasound information at a frame rate that exceeds 50 frames per second—the approximate perception rate of the human eye. The acquired ultrasound information is displayed on the display system 118 at a slower frame-rate. An image buffer 122 is included for storing processed frames of acquired ultrasound information that are not scheduled to be displayed immediately. Preferably, the image buffer 122 is of sufficient capacity to store at least several seconds worth of frames of ultrasound information. The frames of ultrasound information are stored in a manner to facilitate retrieval thereof according to its order or time of acquisition. The image buffer 122 may comprise any known data storage medium.

Figure 2:
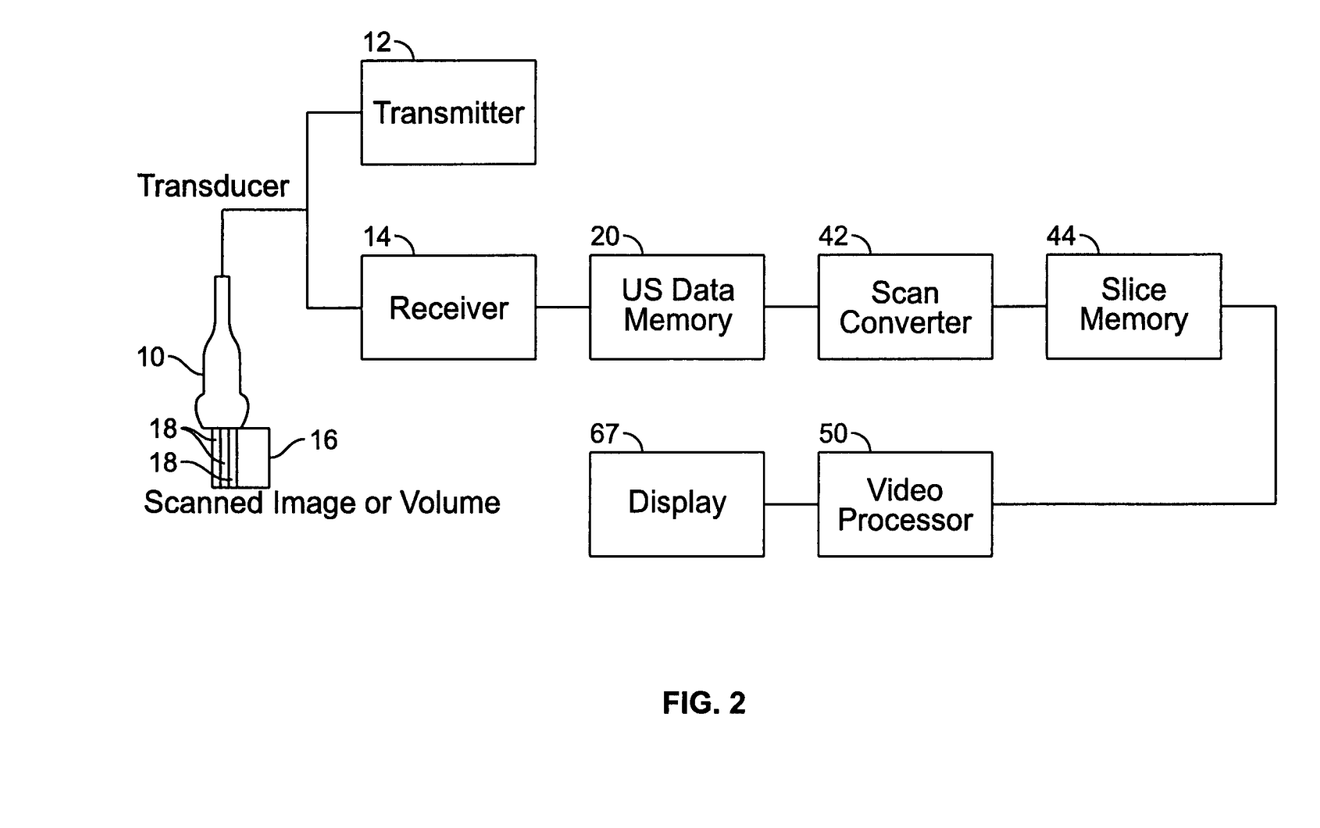
FIG. 2 illustrates an ultrasound system formed in accordance with an embodiment of the present invention.

FIG. 2 illustrates an ultrasound system formed in accordance with one embodiment of the present invention. The system includes a transducer 10 connected to a transmitter 12 and a receiver 14. The transducer 10 transmits ultrasonic pulses and receives echoes from structures inside of a scanned ultrasound image or volume 16. Memory 20 stores ultrasound data from the receiver 14 derived from the scanned ultrasound image or volume 16. The image or volume 16 may be obtained by various techniques (e.g., 3D scanning, real-time 3D imaging, volume scanning, 2D scanning with an array of elements having positioning sensors, freehand scanning using a Voxel correlation technique, 2D or matrix array transducers and the like).

The transducer 10 is moved, such as along a linear or arcuate path, while scanning an image. The scan planes 18 are stored in the memory 20, and then passed to a scan converter 42. In some embodiments, the transducer 10 may obtain lines instead of the scan planes 18, and the memory 20 may store lines obtained by the transducer 10 rather than the scan planes 18. The scan converter 42 may store lines obtained by the transducer 10 rather than the scan planes 18. The scan converter 42 creates a data slice from a single scan plane 18. The data slice is stored in slice memory 44 and then is passed to the video processor 50 and display 67.

Figure 3:
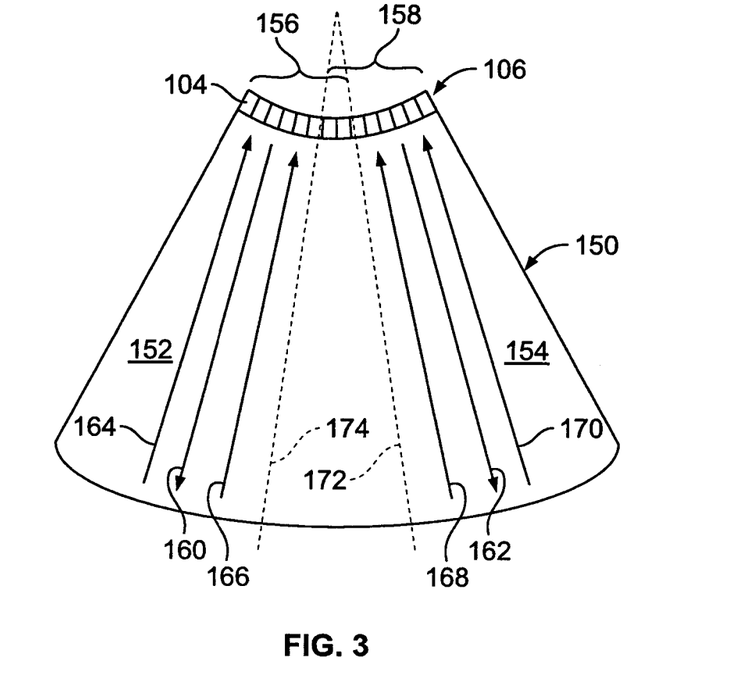
FIG. 3 illustrates an image acquired using two overlapping apertures in accordance with an embodiment of the present invention.

FIG. 3 illustrates an image 150 acquired using two overlapping apertures. The image 150 is formed using first and second transmit beams 152 and 154. The multi-line transmitter 102 fires the first and second transmit beams 152 and 154 simultaneously. Although the first and second transmit beams 152 and 154 are illustrated as being on either side of the image 150, it should be understood that the beamformer 110 may focus and steer the first and second transmit beams 152 and 154 to be anywhere within the image 150. Therefore, the first and second transmit beams 152 and 154 may have different focal points or a common focal point. The first and second transmit beams 152 and 154 may be used to acquire a B-mode volume, Color Flow, Doppler, or a combination of data modes, for example.

A transducer 106 comprises elements 104 as previously discussed. Many types of transducers 106 may be used, including but not limited to linear, virtual convex linear, curved array, 2D array and volume probes. The beamformer 110 divides the elements 104 into at least two overlapping apertures which are represented by dividing lines 172 and 174. The overlapping apertures comprise contiguous elements 104. The elements 104 are divided into two apertures, or into first and second subsets 156 and 158. The first subset 156 comprises the elements 104 which transmit and receive lines to form the first transmit beam 152. The second subset 158 comprises the elements 104 which transmit and receive lines to form the second transmit beam 154.

Each of the transmit beams 152 and 154 comprise multiple transmit lines. For clarity, transmit lines 160 and 162, which are transmitted by an element 104 from within subsets 156 and 158, respectively, are illustrated. The transmit lines 160 and 162 are fired simultaneously. It should be understood that each of the elements 104 may transmit a separate transmit line 160 and 162.

At least one receive line 164-170 is received with respect to each transmit line 160 and 162. In FIG. 3, two receive lines 164-170 are received based on each transmit line 160 and 162. Multiple receive lines 164-170, such as four per transmit line 160 and 162, for example, may be received. The receive data from all receive lines 164-170 is further processed into a single data set and displayed on the display 67.

The elements 104 of FIG. 3 are may be divided into two equal sized apertures, or first and second subsets 156 and 158 having an equal number of elements 104. However, it is not necessary for the first and second subsets 156 and 158 to be equal. Either the first or second subset 156 and 158 may comprise a larger number of the elements 104. Also, as one or both of the first and second transmit beams 152 and 154 are steered by the beamformer 110, their respective apertures may be reduced. The apertures may be predefined based on the type of transducer 106, the application protocol, and the like.

Also, echo signals received by one subset of elements 104 which were transmitted by a different subset of elements 104 are filtered by the code generator 124.

Figure 4:
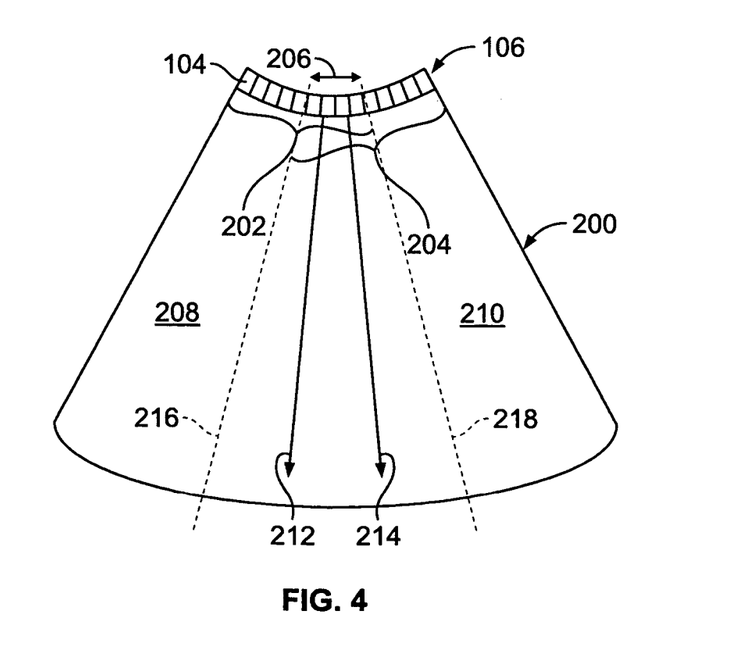
FIG. 4 illustrates an image acquired using two overlapping apertures in accordance with an embodiment of the present invention.

FIG. 4 illustrates an image 200 acquired using overlapping apertures. The beamformer 110 divides the elements 104 into at least two apertures which have an overlapping portion. Therefore, the elements 104 are divided into two apertures, or into first and second subsets 202 and 204, represented by dividing lines 216 and 218. As in FIG. 3, the overlapping apertures comprise contiguous elements 104. The first and second subsets 202 and 204 include elements 104 in common which form a common region 206. As discussed previously, the elements 104 may be divided into more than two overlapping apertures.

First and second transmit beams 208 and 210 are fired simultaneously, as discussed previously. The first and second transmit beams 208 and 210 may be transmitted using either a push/pull amplifier or a linear amplifier, for example. The amplifier is located on the multi-line transmitter 102. When using two or more overlapping apertures, a linear amplifier, a five level amplifier, or a 2N+1 level amplifier may be desirable. A five level amplifier uses +/−10 V and +/−20 V sources to provide voltage levels at −20 V, −10 V, 0, +10 V, and +20 V. A 2N+1 level amplifier uses quantity N amplifiers to provide multiple voltage levels. Using the five level amplifier or the 2N+1 level amplifier provides a close approximation of a linear amplifier without the negative aspects of the linear amplifier, such as cost. The elements 104 within the common region 206 are fired twice, once with respect to the first transmit beam 208 and once with respect to the second transmit beam 210. By way of example, transmit lines 212 and 214 are fired twice, as the elements 104 producing transmit lines 212 and 214 are within the common region 206. The frame rate within the common region 206 is therefore increased. If the transmit lines 212 and 214 are fired N times, the frame rate is increased by a factor of N, providing improved resolution in time.

Figure 5:
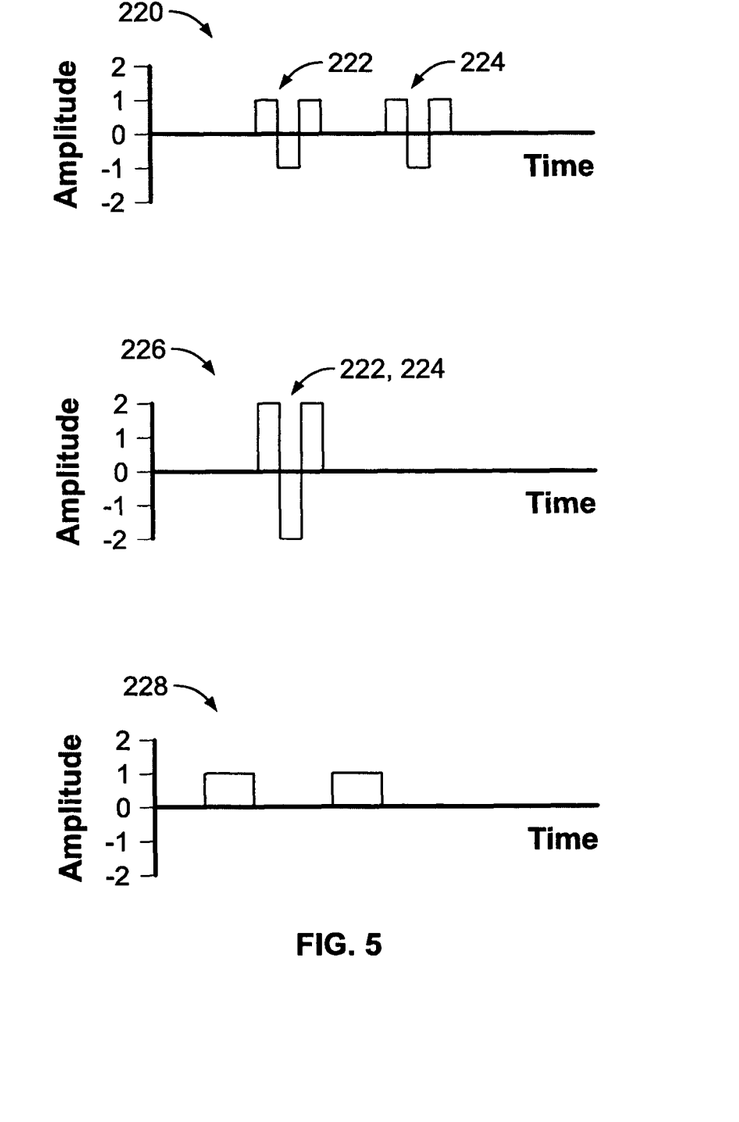
FIG. 5 illustrates an exemplary firing sequence which may occur in the common region in accordance with an embodiment of the present invention.

FIG. 5 illustrates example firing sequences which may occur within the common region 206. A first firing sequence 220 illustrates a first transmit pulse 222 fired with respect to the first transmit beam 208 and a second transmit pulse 224 fired with respect to the second transmit beam 210. Both the first and second transmit pulses 222 and 224 are fired from a single element 104 within the common region 206 and each have an amplitude of one. The first firing sequence 220 illustrates an example where the first and second transmit pulses 222 and 224 have a phase shift great enough to prevent the pulses 222 and 224 from overlapping.

A second firing sequence 226 is illustrated wherein the first and second transmit pulses 222 and 224 have a phase shift of zero degrees with respect to each other. The first and second transmit pulses 222 and 224 completely overlap each other and have an amplitude of two.

A third firing sequence 228 is illustrated wherein the first and second transmit pulses 222 and 224 have a phase shift of 180 degrees with respect to each other. The first and second transmit pulses 222 and 224 essentially cancel each other, resulting in a pulse having zero amplitude. It should be understood that the first through third firing sequences 220, 226 and 228 illustrate phase shifts which have a maximum impact on the first and second transmit pulses 222 and 224, and that other phase shifts will produce firing sequences which overlap to varying degrees.

Figure 6:
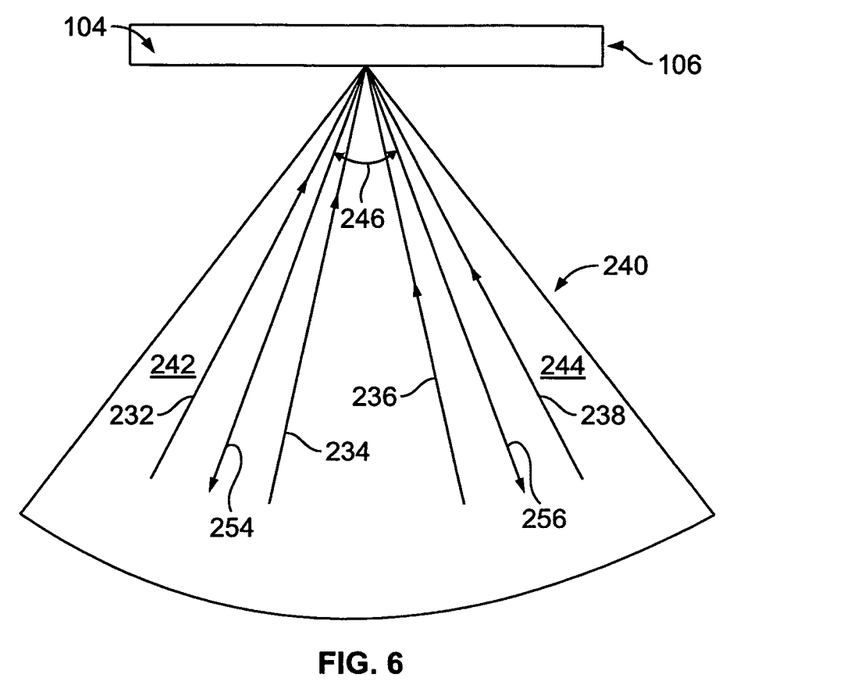
FIG. 6 illustrates an image acquired with a transducer having a phased array in accordance with an embodiment of the present invention.

FIG. 6 illustrates an image 240 acquired with a transducer 106 having a phased array. The phased array comprises elements 104. The entire array of elements 104 may be used for each aperture. The beamformer 110 steers the elements 104 for each aperture independently, and thus the image 240 comprises first and second transmit beams 242 and 244 which are transmit simultaneously. A focus or steering angle 246 may be changed as the beamformer 110 changes the focus of one or both of the transmit beams 242 and 244. As discussed previously, multiple transmit lines 254 are transmitted corresponding to the first transmit beam 242, and multiple transmit lines 256 are transmitted corresponding to the second transmit beam 244. Also, one or more receive lines 232-238 may be received for each transmit line 254 and 256. In addition, the first and second transmit beams 242 and 244 may be transmitted using different modes as discussed previously. Therefore, more than one mode may be displayed on the display 67 simultaneously as the image 240 is acquired in real-time.

The multi-line transmitter 102 may use a transmit mode such as coded excitation to transmit the first and second transmit beams 242 and 244. With coded excitation, each of the first and second transmit beams 242 and 244 have their own code. The code may be generated by the code generator 124.

Figure 7:
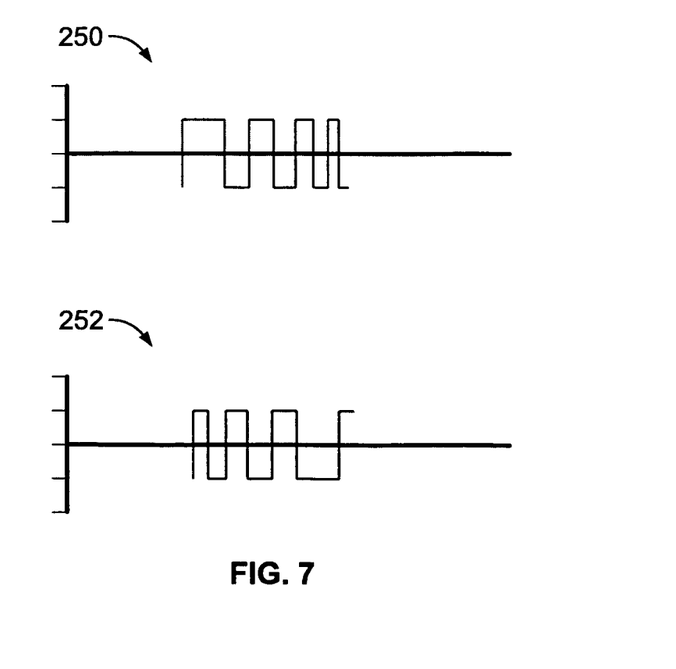
FIG. 7 illustrates an exemplary frequency modulated chirp signal that may bused in coded excitation in accordance with an embodiment of the present invention.

FIG. 7 illustrates an example of frequency modulated chirp signals which may be used with coded excitation. A first chirp signal 250 is illustrated having a low to high frequency, and a second chirp signal 252 is illustrated having a high to low frequency. Therefore, the first and second chirp signals 250 and 252 have linearly increasing and decreasing frequencies, respectively.

The multi-line transmitter 102, using the amplifier, such as one of the linear, five level, and 2N+1 amplifiers, may combine the first and second chirp signals 250 and 252 into a single pulse which is transmitted by the transmit lines 254-256, therefore transmitting the first and second transmit pulses 242 and 244 simultaneously. Alternatively, a time offset (further described below) may be incorporated between transmitting the first and second chirp signals 250 and 252, so that an element 104 is not requested to transmit both signals simultaneously. Other types of signals may also be used, such as binary codes (Barker Golay, for example)

If a push/pull amplifier is being used, a time offset or a time delay may be implemented to overcome the possibility of an element 104 being active simultaneously for both the first and second transmit beams 242 and 244. Alternatively, multiple multi-line transmitters 102 may be used.

Figure 8:
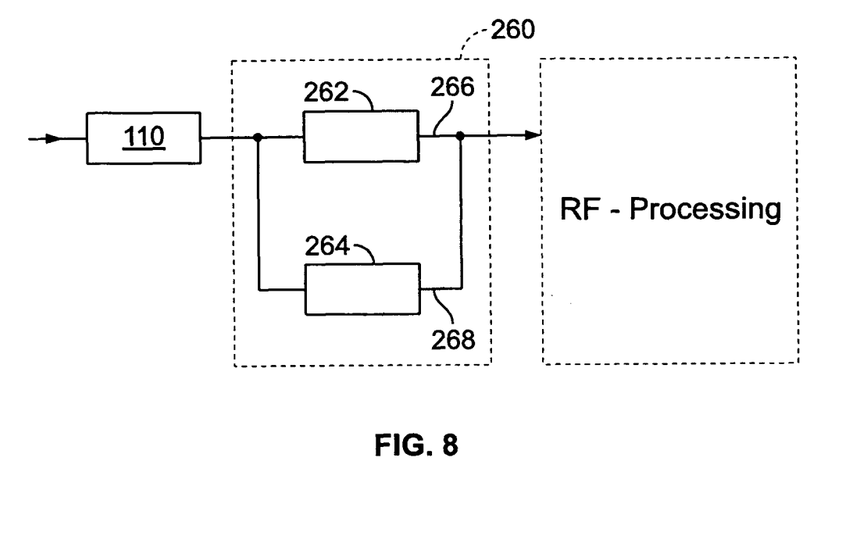
FIG. 8 illustrates a sub-module for processing received coded excitation data in accordance with an embodiment of the present invention.

FIG. 8 illustrates a sub-module 260 for processing received coded excitation data. The sub-module 260 comprises two convolution processors 262 and 264, although it should be understood that more convolution processors may be used. The sub-module 260 may be downstream of the beamformer 110, as illustrated in FIG. 8, or may be incorporated on an ASIC, for example, within the beamformer 110

The elements 104 transmit the first and second transmit lines 254 and 256 simultaneously. As discussed previously, the first and second transmit beams 242 and 244 comprise multiple transmit lines. The elements 104 then receive receive lines 232-238. A single receive line 232 may be received for each transmit line 254, or multiple receive lines, such as receive lines 232 and 234, may be received for each transmit line 254. Therefore, if M lines are transmit, N lines may be received. For example, for every line that is transmit, 2 or more lines, such as 4 lines, may be received. Therefore, if the multi-line transmitter 102 transmits 2 lines, the multi-line receiver 108 receives 8 lines (N*M).

The multi-line receiver 108 passes the receive lines 232-238 to the beamformer 110. The sub-module 260 decodes the receive lines 232-238 line by line. Echo signals received by one subset of elements 104 which were transmitted by a different subset of elements 104 are then filtered by the decoding filter 126.

The beamformer 110 passes the receive lines 232-238 to the sub-module 260. The receive lines 232-238 are sent to both convolution processors 262 and 264, where they are processed in parallel. The convolution processor 262 uses the shape of the first chirp signal 250 to convolve the received lines 232-238, and outputs a signal 266 representative of the first transmit beam 242. The convolution processor 264 uses the shape of the second chirp signal 252 to convolve the received lines 232-238, and outputs a signal 268 representative of the second transmit beam 244. Alternatively, the received lines 232-238 may be convolved with coefficient sets corresponding to the shape of the applicable transmit code. Therefore, the coefficients used by convolution processor 262 would be reversed with respect to the coefficients used by convolution processor 264. The signals 266 and 268 are then further processed and displayed on the display 67 in real-time.

Figure 9:
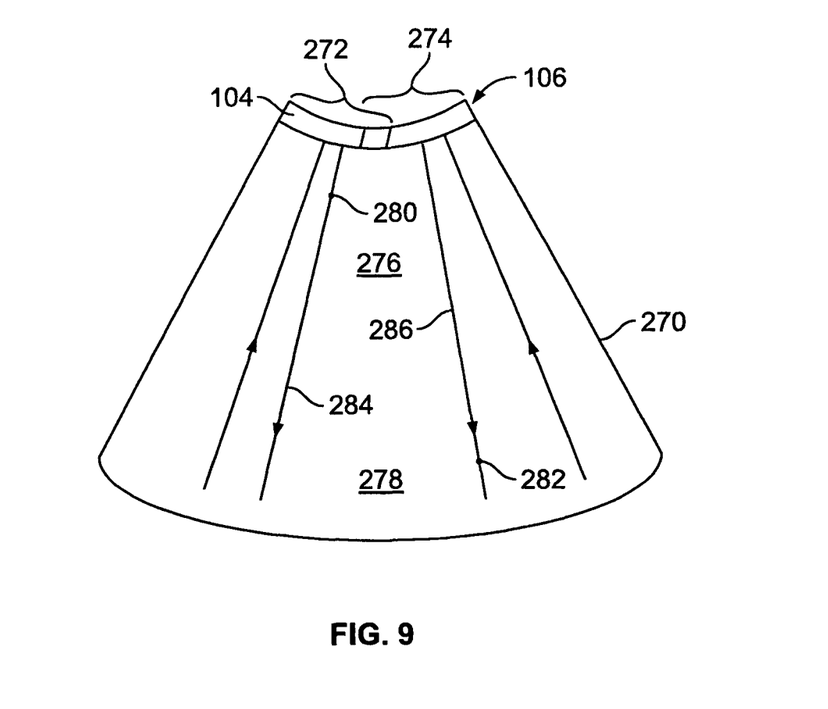
FIG. 9 illustrates an image acquired using several different frequencies in accordance with an embodiment of the present invention.

FIG. 9 illustrates an image 270 being acquired using several different frequencies. The transducer 106 comprises an array of elements 104, as previously discussed, which have been divided into first and second overlapped subsets 272 and 274. The first subset 272 transmits transmit lines 284 at a first frequency. The first transmit beam 276 focuses at a first focal point 280 in the near field. The second subset 274 transmits transmit lines 286 at a second frequency. The second transmit beam 278 focuses at a second focal point 282 in the far field. In this example, the first frequency is transmitted at a high frequency, and the second frequency is transmitted at a low frequency. It should be understood that multiple transmit beams 276 and 278 may be defined corresponding to multiple subsets 272 and 274, allowing transmission of multiple different frequencies focused at different depths. As discussed previously, the focus depth may be changed in real-time with the user input 120.

It should be understood that the multi-line transmit modes using overlapping apertures, with or without codes, may be used to acquire many other imaging modes with increased frame rates, including 3D, 4D, time resolution, color processing, duplex, and the like.

While the invention has been described in terms of various specific embodiments, those skilled in the art will recognize that the invention can be practiced with modification within the spirit and scope of the claims.

What is claimed is:

1. A method for acquiring ultrasonic data using multi-beam transmission, comprising:
    transmitting a first transmit beam using a first subset of elements;
    transmitting a second transmit beam using a second subset of said elements, said first and second subsets of elements comprising at least one common element, said first and second transmit beams being transmitted simultaneously;

encoding within said first and second transmit beams different first and second transmit waveforms, said at least one common element transmitting a pulse that is a combination of said first and second transmit waveforms;

receiving at least one receive line based on said pulse;

convolving said at least one receive line based on a shape of the first transmit waveform to output a signal representative of said first transmit beam; and convolving said at least one receive line based on a shape of the second transmit waveform to output a signal representative of said second transmit beam.

2. The method of claim 1, further comprising dividing said elements into said first and second subsets, said first and second subsets comprising at least partially different subsets of elements, said first and second subsets of elements each comprising contiguous said elements.

3. The method of claim 1, said first and second transmit beams further comprising multiple transmit lines, said method further comprising receiving at least two receive lines for each of said multiple transmit lines.

4. The method of claim 1, further comprising dividing said elements into said first and second subsets that each comprise a different number of said elements.

5. The method of claim 1, wherein said elements comprising said first subset of elements are all common with respect to said elements comprising said second subset of elements.

6. The method of claim 1, the method further comprising steering said first and second transmit beams in first and second directions, respectively, said first and second directions being different.

7. The method of claim 1, wherein the combined signal utilizes 2N+1 voltage levels to transmit said first and second transmit beams, where N is at least 1.

8. The method of claim 1, further comprising producing said first and second transmit waveforms from first and second signals that comprise different frequency modulated chirp signals.

9. The method of claim 1, wherein the first and second beams are transmitted at least partially overlapping in time.

10. The method of claim 1, wherein said combined signal comprises a single pulse.

* * * * *